H. A. W. WOOD.
PRINTING PRESS.
APPLICATION FILED FEB. 7, 1912. RENEWED MAY 16, 1919.

1,327,580.

Patented Jan. 6, 1920.
8 SHEETS—SHEET 1.

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

PRINTING-PRESS.

1,327,580.  Specification of Letters Patent. Patented Jan. 6, 1920.

Application filed February 7, 1912, Serial No. 676,029. Renewed May 16, 1919. Serial No. 297,564.

*To all whom it may concern:*

Be it known that I, HENRY A. WISE WOOD, a citizen of the United States, residing at New York, in the county of New York and State of New York, have invented a new and useful Printing-Press, of which the following is a specification.

This invention relates chiefly to an inking mechanism capable of general use but especially adapted for web presses suitable for newspaper work. The principal objects of the invention are to increase the speed, prevent stops, and improve the quality of the product of such mechanism.

Other objects of the invention are to provide a practicable means whereby the intensity of the color can be varied clear across the web; to provide means whereby the dimple left by the type upon a form inking roll will be removed by one metal roll, and supplied with ink by another; to provide a simple and convenient way in which the form rolls can be washed without removing them from the machine; to provide means whereby the part of one form inking roll which has fed the heavy type of a heading will not register with the same part of its companion roll on its following contact with the printing plate; to provide an improved form of vibrating mechanism for the distributing rolls; to provide simple means whereby the distributing rolls can be adjusted into proper contact with the cylinders and can be moved back out of contact with them and left in such position that they can easily be brought back into contact without interfering with the adjustments previously obtained; to provide a simple and convenient form of mechanism for adjusting the form rolls and their contacting rolls with respect to the cylinders and also for keeping their adjustments when they are moved away therefrom.

Another object of the invention is to provide means for preventing the paper from adhering to the inked printing plates in case of a paper break, and following them around into the inking rolls, thus avoiding the present great delays which result from the winding up of the paper on the inking rolls and the necessity of taking the rolls out and picking off the paper before starting again. Further objects and advantages of the invention will appear hereinafter.

Reference is to be had to the accompanying drawings, in which—

Fig. 3 is a side elevation of a portion of one of the decks on enlarged scale;

In the form of the invention shown in the drawings, a main frame 26 is provided for supporting all the mechanism hereinafter described. This frame is provided with a plurality of rails 27 arranged in pairs, one of those of each pair being at a slight elevation above the other. Each rail supports a carriage or frame 28 movable therealong on rollers 29 toward and from the center of the machine. Each pair of these frames and associated elements constitutes a deck of the press.

Mounted in bearings on the lower part of this frame 26 is a driving shaft 30 having a gear 31 thereon. Through gears 32 and 33 this drives the impression cylinder shaft 34 on which the gear 33 is mounted. This gear 33 meshes with a gear 35 fixed to an impression cylinder shaft 36, located above the shaft 34 and parallel with it. Arranged preferably in vertical alinement above these shafts is a series of shafts designated 34$^a$, 36$^a$, 34$^b$, 36$^b$, 34$^c$, 36$^c$, one pair being located in each deck. On these shafts are mounted gears for driving them in a corresponding order designated 33$^a$, 35$^a$, 33$^b$, 35$^b$, 33$^c$, and 35$^c$.

These gears are of the same diameter and mesh together so that all of these shafts are driven at the same speed, the lower ones of each pair in the same direction and the upper ones of each pair in the opposite direction. To perform a complete printing operation on the web, as will be obvious, each of these shafts is provided with an impression cylinder as 37, 38, 37$^a$, 38$^a$, 37$^b$, 38$^b$, 37$^c$, and 38$^c$.

Figure 1:
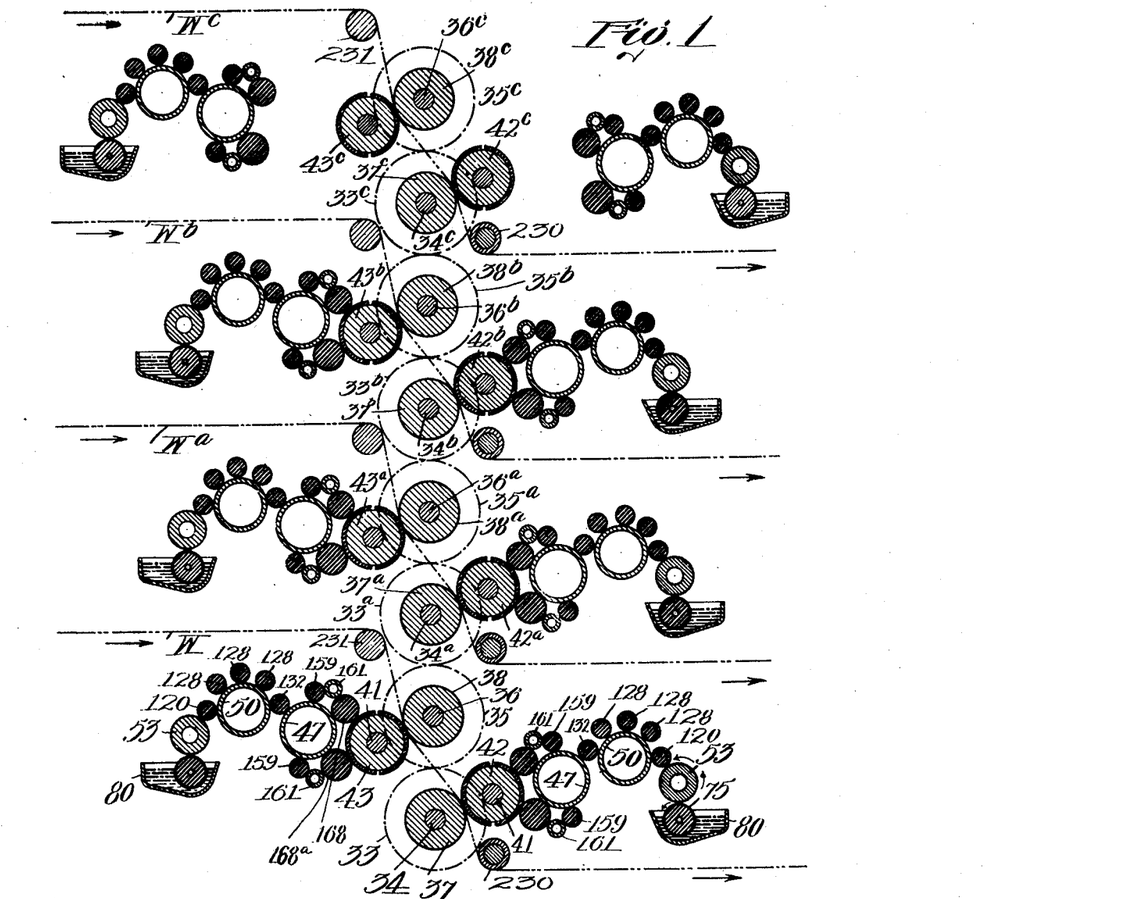
Figure 1 is a diagrammatic view of a four-deck rotary printing press constructed in accordance with this invention and showing the parts in longitudinal section.
Figure 2:
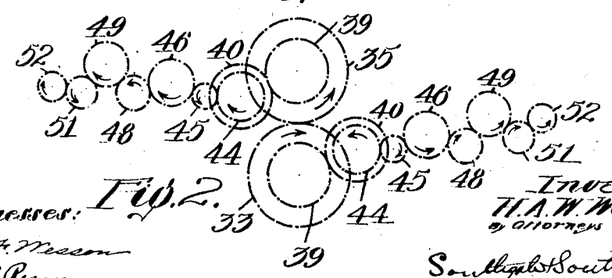
Fig. 2 is a diagrammatic view of one of the decks showing merely the gearing.

On each of the shafts 34, 36, etc., there is a gear 39 meshing with a gear 40 fixed on a printing cylinder shaft 41. On each of these shafts 41 is mounted a printing plate cylinder designated as 42 on the right hand side of the lower deck and 43 on the left hand side. Other plate cylinders 42$^a$, 43$^a$, 42$^b$, 43$^b$, 42$^c$, 43$^c$, appear in corresponding order in the other decks. The parts just above described are supported on the main frame 26. A series of webs W—W$^a$—W$^b$— and W$^c$, are drawn between these printing couples to be printed on both sides as will be explained more in detail hereinafter. On each of the shafts 41 there is located a gear 44 meshing with an intermediate gear 45 and driving a gear 46, fixed on an ink cylinder 47. Also meshing with this gear 46 is an intermediate 48 driving a gear 49 on an ink cylinder 50. This gear 49 also drives another intermediate 51 which in turn drives a gear 52 on a pick up roll 53. The details of the gears so far described need not be gone into as any ordinary arrangement can be employed. It is to be understood however, that the same arrangement is provided in each of the several decks, and that these parts are mounted on the movable frames 28 as will be obvious from a consideration of the top deck in Fig. 1.

The gear 51 is located on a shaft 54 which carries a worm 55 meshing with a worm wheel 56 fixed to a shaft 57. Loose on the shaft 57 are two independent gears 58 and 59 and a clutch 60 is provided for connecting either of the gears 58 or 59 positively with the shaft 57. Loose on an intermediate shaft 61 is a hub 62 having three gears 63 and 64 and 65, the two former of which mesh constantly with the gears 58 and 59 respectively, the gear 65 meshing with the gear 68. On a third shaft 66 are two loose gears 67 and 68 meshing respectively, with gears 64 and 65. A clutch 69 is provided for connecting either of the gears 67 or 68 with the shaft 66. In this way it will be seen that either of the gears 58 or 59 may be clutched to the shaft 57 thus transmitting power to either of the gears 63 or 64 and through them and gear 65 to the gears 67 or 68 either one of which may be clutched to the shaft 66 to produce any one of the four different speeds. The clutches are controlled by arms 70 having spring pressed pins for holding them in depressions 71 in the frame.

The shaft 66 is provided with a worm 72 operating a worm wheel 73 on a shaft 74 on which is located a chilled cast iron fountain roll 75 accurately ground. It is over this roll that the pick up roll 53 rests. This also is of chilled cast iron ground accurately to a cylindrical form. The roll 55 is geared up to run constantly at the same surface velocity as the distributing rolls and the form roll. The chilled cast iron provides hard accurate, lasting surfaces.

An ink fountain 80 is supported by brackets 81 on each of the frames 28 and receives the over shot ink fountain roll 75. This roll of course is provided with the usual scraper 82 and adjusting devices 83. This fountain roll is supported in bearings on the fountain and is shown as provided with a central water heating or cooling pipe 85 extending longitudinally through it from one end. The pipe 85 is supported at its end by a cap 86 which is connected with an inlet pipe 87 from a suitable source of supply. The roll is provided with a passage 88 therethrough larger than the pipe 85 and adapted to receive the water therefrom at its end remote from the pipe 87. The water is conducted back along the outside of the supply pipe 85 through a thimble 89 into a chamber 90 having an outlet 91. The thimble passes through an opening in the side of the frame.

Figures 7, 20:
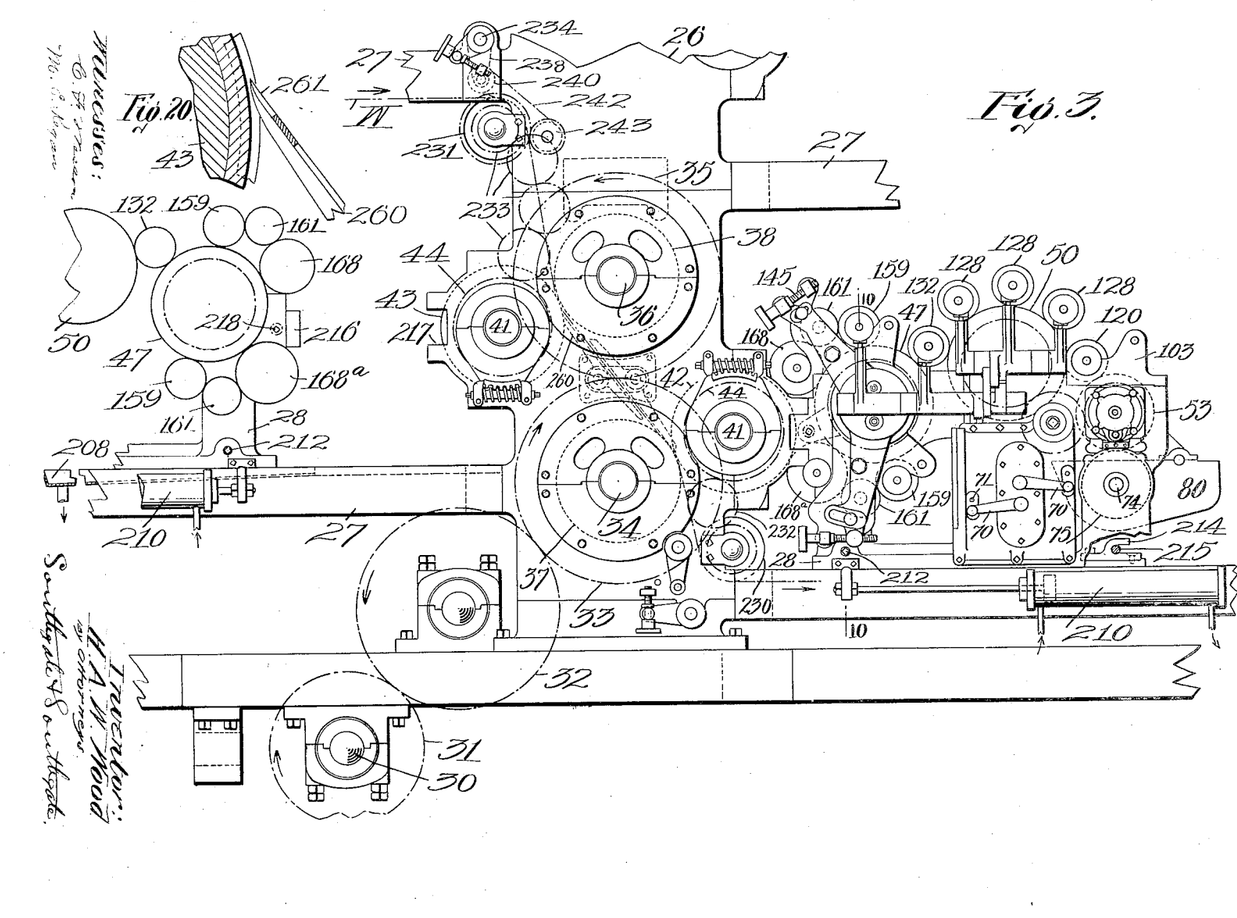
Fig. 7 is a side elevation of this speed mechanism removed from the rest of the machinery.
Fig. 20 is a sectional detail showing the guide fingers for the web.
Figures 7, 8, 9:
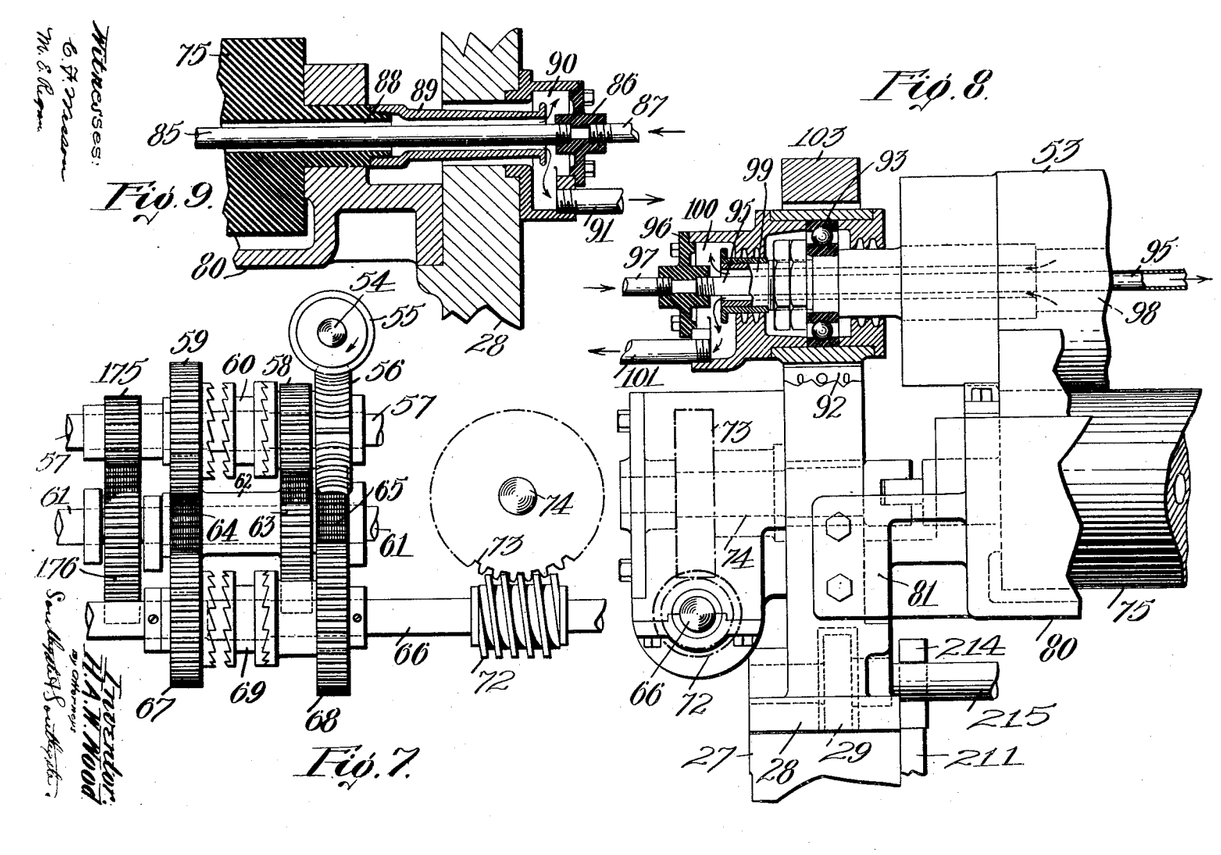
Fig. 8 is a view of the end of the ink fountain and rolls with the upper bearing shown in central section.
Fig. 9 is a central sectional view of the opposite end of the ink roll.

On each of the frames 28 at opposite sides are a pair of adjusting screws 92. The heads of these screws support ball bearings 93 which carry the ends of the pick-up roll 53. It will be observed that the bearings resting on the screws 92 do not fit tightly in the frame, but have a slight amount of play. Accordingly if a wad of paper from a broken web or a piece of dust should pass between the fountain roller and pick-up roller the latter will be lifted, thus permitting the obstruction to pass without springing the parts and without displacing them in any way, because the pick-up roller will come back to its operative position immediately after the obstruction has passed. The separation of these two rollers to provide for this contingency and bringing them back immediately into normal working condition is an important feature, as it automatically takes care of any such small obstructions. At the end the pick-up roll is provided with a pipe 95 threaded into a cap 96 which receives heating or cooling water from a pipe 97. The roll is provided with a passage 98 for receiving water from the other end of the pipe 98 and conducting it through a thimble 99 into a chamber 100 and out through an outlet pipe 101. These parts are similar to the parts just described for heating or cooling the interior of the fountain roll as shown in Fig. 8.

The pick up roll normally rests on the fountain roll but is eased by the adjusting screws 92 when in use. From what has been said about the gearing for driving the rolls 53 and 75 it will be seen that the former runs with the same velocity as the distributing and form rolls, that is at paper speed. The fountain roll, however, is driven in the reverse direction as compared with the other iron roll at their contiguous surfaces, and at a very much slower speed. The difference in surface velocity causes the ink to be spread out evenly. The difference in direction of rotation adds to this effect. Both rolls run constantly so as to furnish a constant uniform film of ink instead of a series of "dabs" of ink. While I have shown both these rolls adapted to be cooled by water, or any cooling fluid, yet in some cases the ink passing over their surfaces seems to be sufficient for the purpose. The fountain roll in its slow continuous motion carries ink, which has been smoothed by its blade, to the cast iron roll 53, which is running in the opposite direction in contact with the ink on its upper side. This upper roll is called a pick-up roll, and picks ink from the fountain roll in a continuous film, and passes it in the form of a continuous film directly to the distributing rolls, which forward it in the same form to the printing plates. It will be observed that in order to maintain this continuous film of uniform thickness on the pickup roll and thus enable said pickup roll to supply a continuous film directly to the distributing rolls, that is, without the need for additional distributing or evening devices, it is essential not only that the pickup roll shall rotate, as stated, in the opposite direction from, and with a much faster surface speed than, the fountain roll, but also that the ink shall be picked up from the fountain and carried upwardly to the surface of the pickup roll, so as to thereby avoid any accumulation of ink on the pickup roll by gravitational flowing such as would occur if the means for supplying the ink to the pickup roll were mounted above the same and the ink were carried down to the pickup roll.

By the change gearing shown, which has four steps, more or less ink, at the will of the operator, can be supplied to the pick-up roll. The highest speed of the fountain roll in my preferred design is one turn to fifteen of the pick-up roll, and the lowest, one to forty five of the pick-up roll. The other speeds are intermediate of these. Of course, the ink can be varied columnwise in the usual way by fountain screws.

Another way of varying the general amount of ink, if the speed of the fountain is left constant, is by varying the distance between the pick-up and fountain rolls. This can be done by the screws 92 under the pick-up roll journals, although this is not their chief function.

By this arrangement of inking apparatus I dispense with reciprocating parts and with a composition roll which must be stopped and started. Also, I supply from the fountain a preliminarily thinned out and distributed, continuous, uninterrupted, uniform film or sheet of ink which passes directly from fountain to type in an unimpaired sheet like condition.

Figures 13, 14, 15, 16, 17, 18, 19:
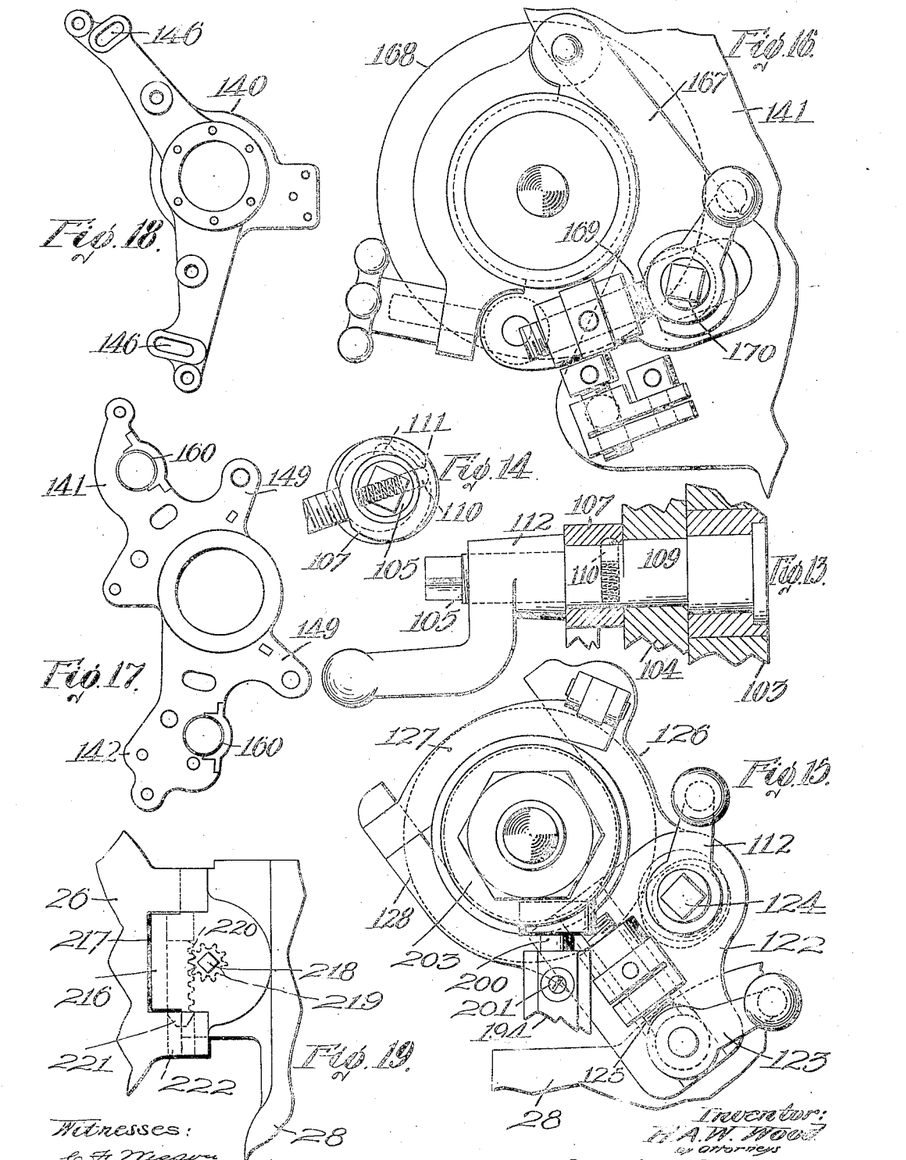
Fig. 13 is a sectional view on the line 13—13 of Fig. 5 showing a clamping bolt.
Fig. 14 is an end elevation of the clamping bolt shown in Fig. 13.
Fig. 15 is a side elevation on enlarged scale of one of the distributing roll holding devices shown in Fig. 4.
Fig. 16 is an elevation similar to Fig. 15 of the supporting devices for one of the form rolls.
Fig. 17 is a side elevation of a pair of swinging arms for supporting the form rolls and two of the distributing rolls.
Fig. 18 is a similar view of a stationary arm connected therewith.
Fig. 19 is a detail illustrating a stop for the movable frame.
Figures 21, 22, 23, 24, 25, 26:
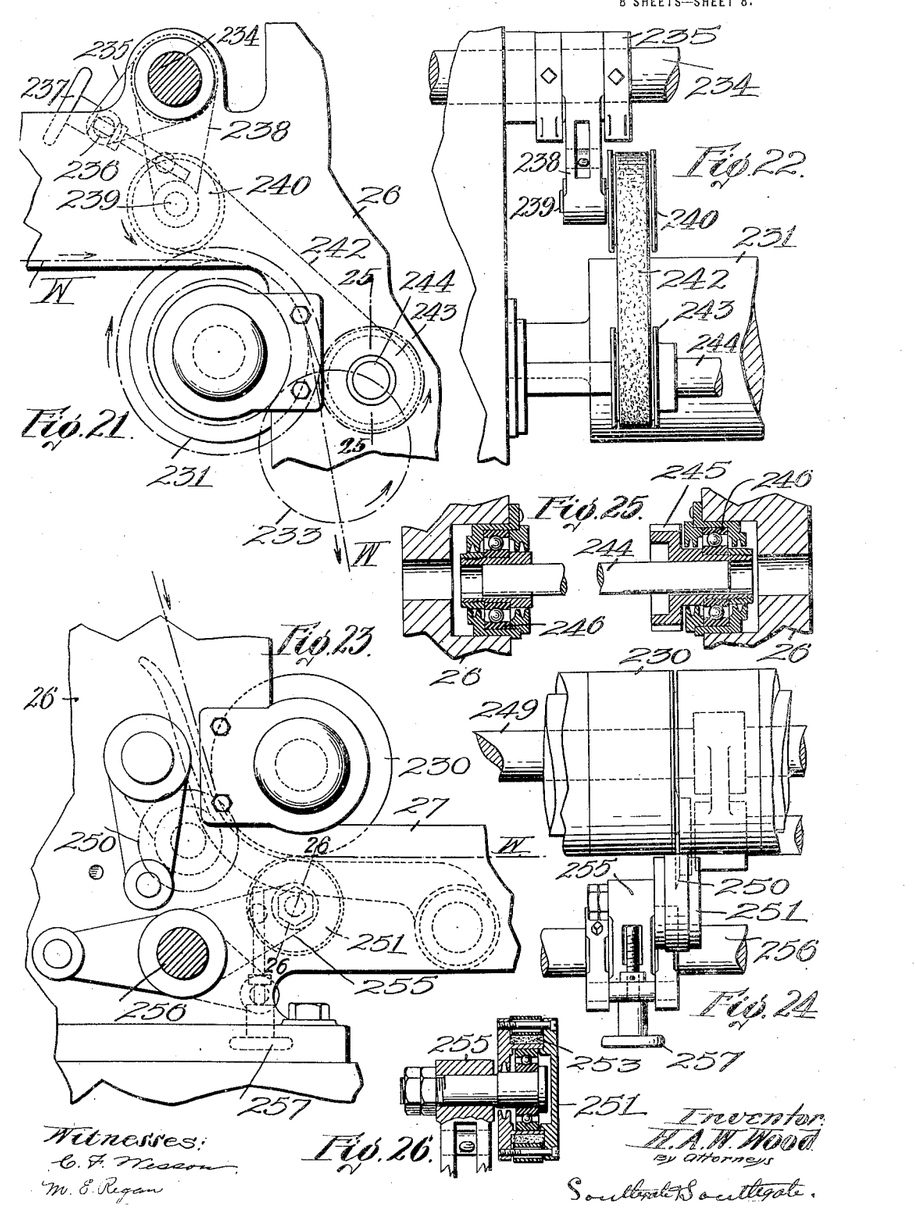
Fig. 21 is a side elevation on enlarged scale showing a portion of the web guiding device.
Fig. 22 is an end elevation of the elements shown in Fig. 21.
Fig. 23 is a view similar to Fig. 21 showing another portion of the web guiding device.
Fig. 24 is an end elevation of the elements shown in Fig. 23.
Fig. 25 is a longitudinal sectional view on the line 25—25 of Fig. 21 showing the bearings for one of the shafts.
Fig. 26 is a similar view on the line 26—26 of Fig. 23.

The bearings of the pick-up roll 53 are supported in jaws 102 in the frames 28. Caps 103 are provided for closing the tops of these jaws. On each of these caps is mounted a socket member 104 to swing on the axis of a release bolt 105. This bolt is mounted in a slot 106 in the cap 103 and is adjusted back and forth by an eye-bolt 107 toward and from the cylinder 50. The bolt is adjusted by a nut on the eye-bolt between two lugs 108. This bolt is provided with a head at one end as shown in Fig. 13 and with an eccentric part 109 on which the socket member 104 is mounted and it also has a spring-pressed pin 110 adapted to enter either one of two depressions 111 in the inner circumference of the eye-bolt to hold the release bolt in either of two adjusted positions. This bolt can be turned to these positions by loosening a hand-nut 112 and applying a wrench to the square end of the bolt to turn it. The socket member 104 is provided with a projection 113 adapted to be adjusted about the bolt 105 by an adjusting screw 114 having a split spring lock nut 115 thereon to hold it in adjusted positions. This bolt is mounted on a bracket 116 on the frame 28. The socket member 104 is provided with a substantially semi-circular socket which is closed at the top by a cap 118 hinged to the socket member at 119. In the bearings thus formed are supported the opposite ends of a roll 120 for taking the ink from the pick-up roll 53 and applying it to the ink cylinder 50. It rotates by frictional contact with the surfaces of these two cylinders and at the same circumferential speed.

Figure 4:
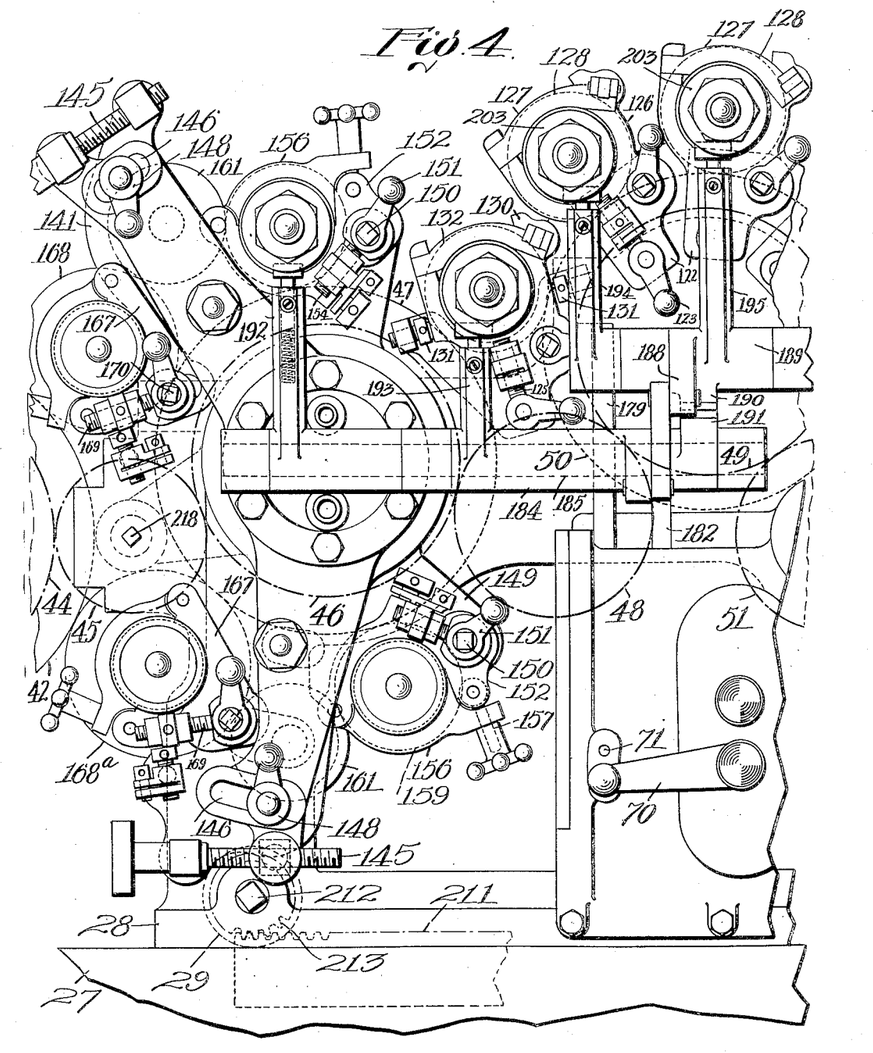
Fig. 4 is a similar view of a portion of the device on enlarged scale.
Figures 5, 6:
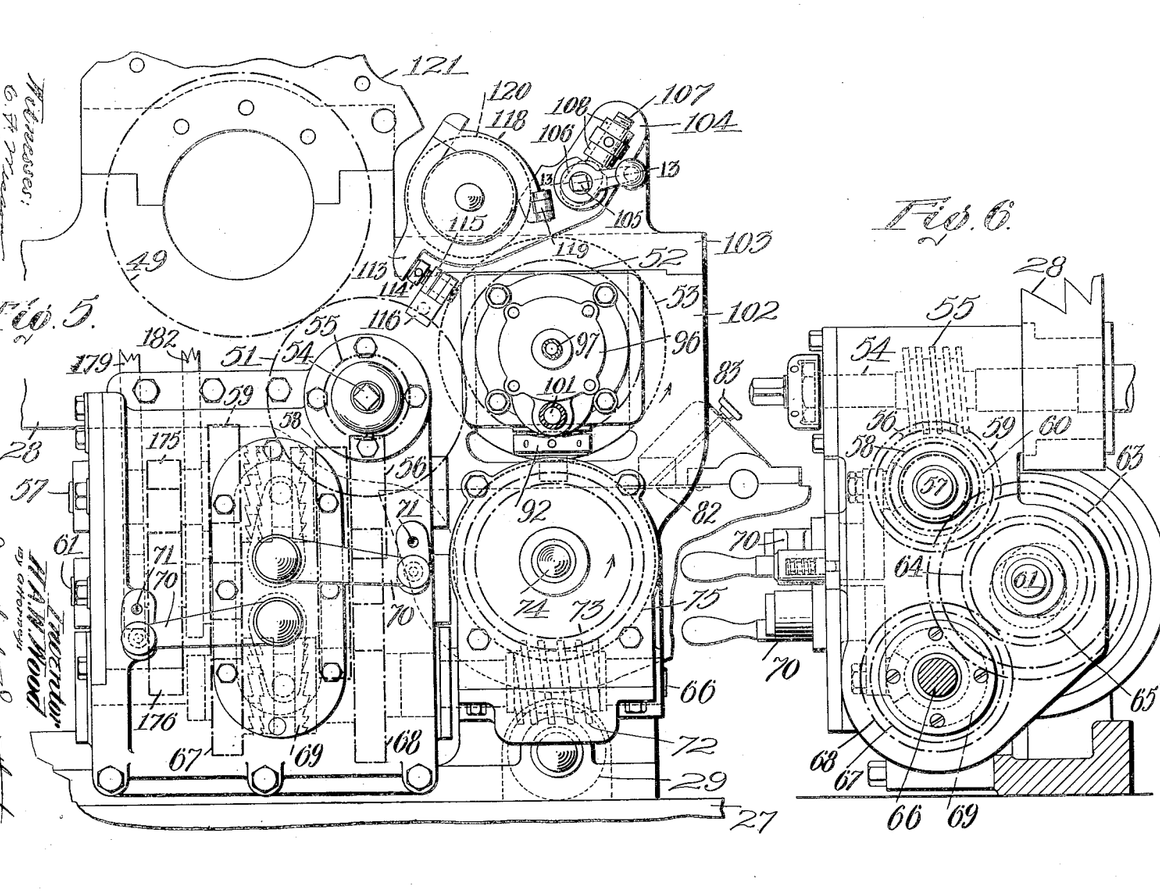
Fig. 5 is a similar elevation at the ink supplying end of the machine.
Fig. 6 is an end view of the speed changing mechanism shown in Fig. 5.

The frame 28 is provided with a plurality of depressions 121 arranged about the center of the cylinder 50. Adjacent to each of these depressions is fixed a bracket 122, (Figs. 4 and 15) by a bolt and locking nut 123. On each of these brackets is a bolt 124 similar in all respects to the bolt 105, except that it is not connected with the eye-bolt 125. It is supported by the bracket and its eccentric portion carries a socket member 126 which is provided with a cap 127 to support the bearings of a distributing roll 128. From consideration of Fig. 13 and the description of the bolt 105 it will be seen that each of these three distributing rolls and the roll 120 can be adjusted with a fine adjustment by means of the several eye-bolts toward and from the cylinder 50 to get the proper pressure and that when they are to be out of use they can be thrown back by loosening the hand nuts 112 and turning the bolts 105 and 124 respectively so as to cause the eccentrics thereon to move the socket members outwardly. Then when they are moved back they will be in the same adjustment as before.

Between the two cylinders 50 and 47 is another socket piece 130 constructed in a similar manner, but having adjusting screws 131 on the opposite sides thereof, to permit its distributing roll 132 to be adjusted so as to contact accurately with both cylinders, and otherwise operating similarly to the socket piece 126. It has an eye-bolt 125, locking nut 123, etc.

These distributing rolls 120, 128, and 132 are as usual of composition and driven merely by contact with the ink cylinders, the roll 132 being in contact with both of the cylinders 47 and 50.

The cylinders 47 and 50 are shown as internally water heated or cooled by mechanism similar to that illustrated in connection with the fountain roll and pick-up roll.

For supporting a series of rolls around the inking cylinder 47 the following mechanism is provided:—On the frame 28 is fixed a stationary support 140 having a hub concentric with the bearing of the cylinder 47. This stationary support has two arms one extending upwardly and the other downwardly from the center. Two independent swinging arms 141 and 142 are provided, each having a hub mounted on the bearing of the cylinder and capable of being adjusted about said bearing as a center. These arms are connected with the stationary support by bolts 143 having shoulders between the support and arm on which are mounted collars 144. These parts constitute spacing studs for keeping the swinging arms in proper position relative to the stationary support. It will be observed by reference to Fig. 10 that the stationary support is on the outside of the frame while the swinging arms are between it and the frame. For the purpose of adjusting the swinging arms relative to the support, adjusting screws 145 are shown connecting them. In order to hold the arms in adjusted positions the support is provided with two slots 146 through which pass release bolts 147 provided with clamping nuts 148 like the nuts 112 and acting in the same way. On projections 149 on the rear edges of the swinging arms are mounted bolts 150 similar to the bolts 105 and provided with locking nuts 151 for holding a pair of socket members 152. In a way similar to that which has been described heretofore these socket members are provided with slots for the bolts 150, and the fine adjustment is secured as in the cases which have been described before by adjusting screws 154 and spring clamps. In this case, however, the cap 156 for the socket member is connected with the socket member by an eye bolt 157 so as to be more readily disengaged. Although this description has been given in the singular it will be understood that it applies to two elements, one above the cylinder 47 and the other below it, and that each of these socket members carries a composition distributing roll 159. It will be understood, of course, that these rolls although carried by the swinging arms are secured thereto and adjusted thereon in a manner which has been described with reference to the distributing rolls surrounding the cylinder 50.

Figures 10, 12:
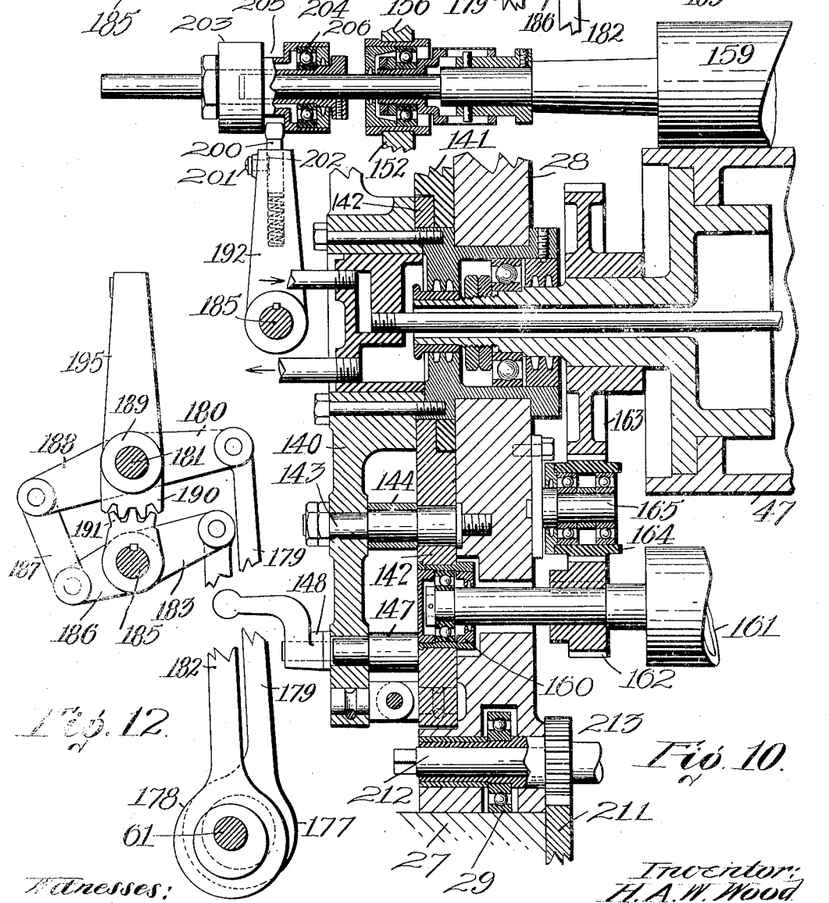
Fig. 10 is a central sectional view on the line 10—10 of Fig. 3 on enlarged scale.
Fig. 12 is an end elevation of a portion thereof.
Figure 11:
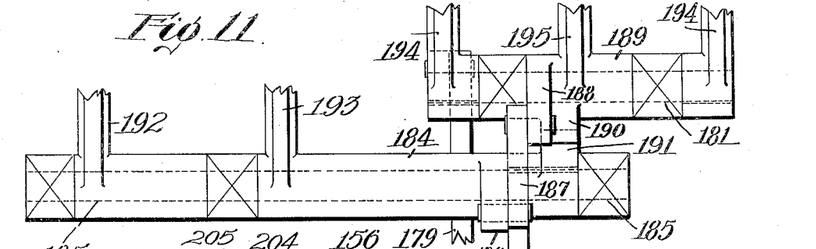
Fig. 11 is a side elevation showing a portion of the vibrating device for the distributing rolls.

Mounted in bearings 160 on the two swinging arms are metal rolls 161. These rolls are not adjustable except with the movement of the swinging arms, but it will be obvious that the rolls 159 on these arms can be adjusted toward and from them as well as toward and from the cylinder 47 and they are intended to be adjusted so as to come into contact with both with sufficient pressure to insure proper delivery of the ink. The bearings 160 preferably are of the ball type as indicated in Fig. 10. On each of the shafts of the rolls 161 is mounted a gear or pinion 162 for receiving power from a gear 163 on the shank of the cylinder 47 through an intermediate ball bearing gear 164 on a stud 165. It will be seen therefore that the rolls 161 are positively driven while the distributing rolls are driven only by surface contact.

The swinging arms also have another function. This description of the supporting means for the two distributing rolls 159 in contact with the cylinder 47 will apply with very slight modifications to a socket member 167 on the opposite side of each swinging arm. These support two form rolls 168 and 168ª. By screws 168 similar to the adjusting screw for the distributing rolls these form rolls can be adjusted into proper contact both with the cylinder 47 and the metal rolls 161, and then the two swinging arms can be adjusted as a whole to bring the form rolls into contact with the plate cylinder 42. The form rolls can be moved away from the cylinder 47 by release eccentric bolts 170 similar to the bolts 105. An important feature of these form rolls, aside from the fact that they contact in addition to the cylinders 42 and 47 with the positively driven metal rolls 161, thus receiving ink from two different sources, is the fact that they are of different diameters.

One advantage of having the form rolls of different sizes is that the gray reproduction of the large type of the heading on other parts of the paper which is frequently seen in the present kinds of printing is substantially eliminated because this gray effect will not come in the same place on the two rolls. The depleted spots therefore on the two rolls will not register on the second revolution and thus one roll will correct the defects of the others. This is an important feature. When a form roll inks the heavy heading of the first page of a newspaper, or the like, the heading type robs the form roll of considerable ink. This leaves on the form roll a print of the letters in "white" so to speak, and these "white" portions are resupplied with ink from the distributing cylinder with which the rolls come in contact. I have found, however, that this single contact with the distributing cylinder supplies only a thin film of ink which usually is not sufficient to fill the depleted portions of the form roll. As a rule, therefore, it is not possible to carry color enough to print a heading in a distinct black without carrying too much for the surrounding smaller type. By making the form rolls of different diameters this defect is largely remedied; and as each form roll contacts both with the ink cylinder 47 and the metal roll 161 it also has two chances of resupplying its depleted portions. In other words, each of the form rolls comes into contact with the printing plate and two metal distributers. Another advantage of this arrangement is that when a form roll is set so hard that the heading makes a dent in it, the first metal roll helps to iron out the dent so that its low spots are brought up, and may be supplied with ink by the second metal roll. This is an improvement over the present practice in which the dent would receive little if any ink.

It will be remembered that the change speed gearing for the inking roll comprises a shaft 61 on which the intermediate gearing of the change speed mechanism runs loosely. So far as the speed change gearing is concerned this shaft might be stationary. However it is operated by a gear 175 on the shaft 57 meshing with a gear 176 on the shaft 61. On this shaft are two eccentrics 177 and 178. The former is provided with an arm 179 operating an arm 180 fixed on a shaft 181. The eccentric 178 has an arm 182 operating an arm 183 on a sleeve 184, loose on a shaft 185 parallel with the shaft 181. The sleeve 184 has an arm 186 connected by a link 187 with an arm 188 on a sleeve 189 loose on the shaft 181. On the sleeve 189 is fixed a gear segment 190 meshing with a gear segment 191 fast to the shaft 185. It will be seen, therefore, that the eccentric 177 oscillates the shaft 181 and that the eccentric 178 oscillates the sleeve 184 about the shaft 185, and through the arm and link it oscillates the sleeve 189. From this through the gear segment it oscillates the shaft 185, which shaft is oscillated at all times in the direction opposite to the motion of the sleeve thereon. Fixed on the shaft 185 is a vibrating arm 192 and fixed to the sleeve 184 is a similar arm 193, these arms therefore, will oscillate alternately. Fixed to the shaft 181 are two similar arms 194, while on the sleeve 189 is a similar arm 195. These two sets of arms also oscillate alternately.

The arms 194 and 195 are connected with the distributing rolls 128 for vibrating them longitudinally. The arm 193 is similarly connected with the roll 132 and the arm 192 with the upper distributing roll 159. The connections in each case are as follows:— Each of the arms for example, 192 is provided with a spring pressed plunger 200, the reciprocation of which is limited by a pin 201 working in a slot 202 in the plunger. On the shaft of the composition roll there are two cylinders 203 and 204 having a groove 205 between them into which the end of the plunger 200 can enter. These cylinders are mounted on the shaft by a ball bearing 206. In view of the oscillation of the arm 192 it will be obvious that no attention need be paid as to whether the head of the plunger 200 is in the groove or not. On account of the position of the arm the head of the plunger will engage one of the cylinders 203 and 204, and as it vibrates it will eventually come into registration with the groove when the spring will act to press it into the groove. It then vibrates the shaft longitudinally.

As one of the form rolls is large and heavy, I have arranged means whereby it need not be removed for washing. This applies to both rolls, however. I have stated heretofore that the frame 28 is capable of moving back to the position shown at the top of Fig. 1. When the carriage is backed a man can step upon the platform between the form rolls and cylinder and wash them. As has been stated each form roll also is provided with a release bolt 170 which will throw it out of contact with its ink cylinders instantly (see Fig. 3). In this way it will be seen that it can be washed very easily without removing it. In order to facilitate this operation a pan 208 is employed to catch the cleaning fluid and drain it off so that the paper in the lower decks shall not be soiled.

A pressure cylinder 210 is shown for moving the carriage. With this cylinder arrangement the attendant need only turn an air cock in order that the roller carriage 28 may be moved away and back. It is sometimes desirable to move it by hand however. For this reason a rack 21 is shown fixed on the rail 27 and the carriage is shown as provided with a shaft 212 having a square end on which shaft is a pinion 213 meshing with the rack. This can be used in emergencies and whenever it is not desired to use the cylinder.

For the purpose of locking the movable carriage 28 to rail 27, a yoke 214 is mounted on the stationary rail 27 to receive a pin 215 on the carriage and stop it. In order to lock the carriage in its operative position it is provided with a projection 216 adapted to enter a slot 217 in the stationary frame. In this projection is a shaft 218 having a square end and carrying a pinion 219 meshing with a vertical rack 220 which has a pin 221 on the end for entering a hole 222 in the stationary frame and holding the movable carriage in fixed position.

The paper forwarding roll 230 between the press and folder is of half the diameter of the printing cylinder. In this way it has a circumference exactly the length of one sheet and so will receive the set off of each sheet in exactly the same spot. In view of the fact that it is now almost universally the custom to have the two following plates in each plate cylinder alike it will be seen that the set-off of one sheet will be returned to the next sheet in register and therefore will be off-set upon the printed portions and not upon the white spaces as has been the case heretofore. In other words the off-set is registered and is therefore hidden. This is carried out in the case of each roll between the press and folder. This forwarding roll 230 as well as the forwarding roll 231 is driven positively from the gear 44 by means of gearing 232 and 233. In this way the rolls can not get out of register and the web is positively driven.

In order further to facilitate the positive driving of the web the following mechanism is provided. On the frame is located a fixed rod 234 on which are fixed a pair of ears 235. These ears carry a rod 236 through which passes an adjusting screw 237 for engaging a lever or arm 238 loose on the shaft 234 and for adjusting it about the shaft. On a stud 239 on this arm is journaled a flanged pulley 240. This pulley is provided with ball bearings. On this pulley passes an endless rubber belt 242 which also passes over a flanged pulley 243 on a shaft 244. This shaft 244 is positively driven from the gear on the roll 231 by a gear 245 and is mounted in ball bearings 246 on the frame.

On the other side of the impression mechanism the roll 230 is located as has been stated. This is made up of a plurality of pulleys or cylinders fast on a shaft 249. Between any two of these cylinders a slitting knife 250 can be located. The web is held against the surface of this roll by a plurality of hollow rolls 251 in which rubber rolls 253 are mounted. These rolls 251 are driven by frictional contact with the roll 230. Each of these rolls 251 is mounted on an arm 255 adjustable about a shaft 256 by a screw 257 in the same manner as described in connection with the pulley 240.

Particular attention is directed to the relative locations of the rolls 230 and 231 with respect to the impression and printing cylinders. They are so located that the paper has only a slight bend about the impression cylinders; that is, each pathway is deflected from a straight line only to the extent that will prevent the paper contacting with the printing plates until just after it has contacted with the impression cylinders. This is for the purpose of avoiding the slapping of the paper against the printing cylinder and sticking to the plates thereof on the one hand, and to avoid wrapping the paper around the impression cylinders on the other hand, which is ordinarily done.

I bend the web pathway from a straight line only sufficiently to keep it off the type until the moment of printing, and to strip it from the type immediately after printing. In other words I permit the impression and printing cylinders to do the work of printing in a cleanly manner, but I do not permit the impression cylinder to take charge of the web to any great extent, and thus I leave the web free to go or come during the passage of the margins.

The objections to the usual practice are that when the blankets are too thick the cylinder will be overdiameter and the web will be fed too fast, and when the blankets are old and thin the paper is fed too slowly. When the web is wrapped around a cylinder it must conform to its surface speed whether it be too fast or too slow. This brings strains into the paper and causes it to tear, unless a relatively high grade of paper is used. By avoiding this wrapping, the paper is neither advanced nor retarded to as great a degree as heretofore, and fewer breaks will happen, thus permitting the use of less expensive paper and avoiding the loss of valuable time. Moreover the margins of a blanket which lie between the page surfaces invariably stand up above these surfaces, and if the web is wrapped around the cylinder these, by their abnormal height, cause wrinkling of the web which sets up strains that result in breaks. This danger is also substantially eliminated by this plan.

The web pathway between two of the points of impression is equal in length to a printed product or a multiple thereof, and the transverse plate margins coincide so that those of both couples simultaneously pass their respective points of impression. Twice in each revolution therefore the paper will be free of any impression and at liberty to move relatively a little forward or backward notwithstanding the blankets are too thick or too thin. This prevents the forwarding of too much paper or too little, a result that could not be obtained with the usual wrap around the impression cylinder, and margins that do not coincide.

The plate cylinders are shielded by shields 260 at a point just beyond the points of impression. These are so arranged that the web as it leaves the line of impression passes between the shields and impression cylinders. These shields are provided with fingers 261 which protrude into the margins between the plates beneath the printing line. The object of this construction is to prevent the paper from adhering to the inked plates and following them around the cylinders into the rolls in the case of a paper break. This avoids the present great delays which result from the winding up of the paper on the inking rolls and the necessity for taking the rolls out and picking off the paper before starting again. This is an important feature of the invention.

I have not claimed herein the features of the printing mechanism independently of the inking mechanism, as that constitutes the subject matter of my divisional application, Serial No. 200,313, filed November 5, 1917.

Although I have illustrated and described a preferred embodiment of the invention described herein, I am aware that many modifications can be made therein by any person skilled in the art without departing from the scope of the invention as expressed in the claims. Therefore I do not wish to be limited to all the details of construction herein shown and described, but what I do claim is:—

1. In an inking mechanism the combination of a fountain, a fountain roll dipping down from above into the ink therein and running at a slow speed so as to pick up a coating of ink thereon, and a pick-up roll running in coöperation with said fountain roll in a reverse surface direction at a higher speed so as to carry the ink from the surface of said coating in an attenuated continuous film without carrying said film between the rolls.

2. In an inking device, the combination of two ink cylinders, a plurality of distributing rolls arranged around one of said cylinders, a distributing roll in contact with both cylinders, another distributing roll in contact with the second cylinder, and means for vibrating each two adjacent rolls in opposite directions.

3. In an inking device, the combination with an ink cylinder, of a composition roll therefor, an adjustable support for the roll, said roll having a circumferentially grooved cylinder thereon, an oscillatable arm, and a spring-pressed plunger on the arm for engaging in said groove to reciprocate the roll longitudinally.

4. In an inking mechanism, the combination of a pair of shafts, a sleeve on each shaft, means for oscillating one of the sleeves, means connected with one sleeve for oscillating the sleeve on the other shaft, means connected with the last named sleeve for oscillating the shaft on which the first sleeve is mounted, a plurality of ink distributing rolls, and vibrating devices for said rolls, connected with said shaft and sleeves.

5. In an inking mechanism, the combination of a pair of shafts, a sleeve on each shaft, a pair of eccentrics, means connected with one of the eccentrics, for oscillating the sleeve on one shaft, means connected with the last named sleeve for oscillating the sleeve on the first named shaft, and means connected with the sleeve on the first named shaft for oscillating the second shaft.

6. In an inking mechanism, the combination of a pair of shafts, a sleeve on each shaft, a pair of eccentrics, means connected with one of the eccentrics for oscillating one of the shafts, means connected with the other eccentric for oscillating the sleeve on the other shaft, means connected with the last named sleeve for oscillating the sleeve on the first named shaft, means connected with the last named sleeve for oscillating the second shaft, a plurality of ink distributing rolls, and four sets of vibrating devices for said rolls, one set being connected with each shaft and one with each sleeve.

7. In an inking mechanism, the combination of a pair of shafts, a sleeve on each shaft, a pair of eccentrics oppositely located, means connected with one of the eccentrics for oscillating one of the shafts, means connected with the other eccentric for oscillating the sleeve on the other shaft, means connected with the last named sleeve for oscillating the sleeve on the first named shaft, means connected with the last named sleeve for oscillating the second shaft, a plurality of ink distributing rolls, and four sets of vibrating devices for said rolls, one set being connected with each shaft and one with each sleeve, whereby each shaft and its sleeve will oscillate in opposite directions.

8. In an inking mechanism the combination of an ink cylinder, a pair of form rolls, means for adjusting said form rolls individually about the center of the ink cylinder as an axis, a pair of ink distributing rolls in contact with the ink cylinder, each movable with one of the form rolls, said form rolls and ink distributing rolls being of composition and driven by surface contact with the ink cylinder, and a pair of metal rolls each in contact with one of the form rolls and one of the distributing rolls.

9. In an inking mechanism the combination of an ink cylinder, a pair of form rolls, means for adjusting said form rolls individually about the center of the ink cylinder as an axis, and a pair of ink distributing rolls in contact with the ink cylinder but not in contact with a form roll, each movable with one of the form rolls.

10. In an inking mechanism, the combination with an ink cylinder, of a composition distributing roll in contact therewith, a composition form roll in contact with the ink cylinder, a metal roll in contact with both the distributing roll and the form roll, means for positively driving said metal roll, and means whereby all three of said rolls can be adjusted circumferentially with respect to the ink cylinder.

11. In an inking mechanism, the combination with an ink cylinder, of a composition distributing roll in contact therewith, a composition form roll in contact with the ink cylinder, a metal roll in contact with the ink cylinder, means for positively driving said metal roll, means whereby all three of said rolls can be adjusted circumferentially with respect to the ink cylinder, and means for adjusting the composition rolls toward and from the metal roll.

12. In an inking mechanism, the combination with an ink cylinder, of a fixed arm adjacent to the end thereof, a second arm mounted to swing about the axis of the ink cylinder as a center, means on the stationary arm for holding the swinging arm in adjusted position, a metal roll supported at one end by the swinging arm, and a composition roll mounted on the swinging arm and movable into contact with the metal roll and ink cylinder.

13. In an inking mechanism, the combination with an ink cylinder, of an arm adapted to swing about the axis thereof, a metal roll supported by said arm, means for fixing said arm in adjusted positions, a composition roll supported by said arm, means for adjusting the composition roll on the arm toward and from the ink cylinder and metal roll, and means independent of said adjusting means for releasing the composition roll and moving it out of adjusted position, whereby when the releasing means is restored the composition roll will be restored to its adjusted position.

14. In an inking device, the combination of a socket member adjustably mounted and having a socket for receiving a bearing, a roll having a bearing in said socket, and a bolt mounted to turn and having an eccentric portion, the socket member having a perforation for receiving said eccentric portion of the bolt, whereby the oscillation of the bolt will change the position of the socket member.

15. In an inking device, the combination of a frame, a bolt mounted to turn therein and having an eccentric portion, a socket member having a perforation for receiving said eccentric portion of the bolt, an ink distributing roll mounted on said socket member, and means on the frame for adjusting said socket member, whereby after the socket member is adjusted to bring the roll into proper position the bolt can be turned to move the roll from that position and can then be turned back to original position without disturbing the adjustment.

16. In an inking mechanism, the combination of a fountain roll, an ink roll, and a pick-up roll running in coöperation, said pick-up roll being constantly just out of contact with the ink roll, means for positively driving the fountain and pick-up rolls independently, and means whereby when an obstruction passes between said fountain and pick-up rolls they will separate to allow the obstruction to pass and immediately return to normal working position.

17. In an inking mechanism, the combination of a fountain roll, and a metallic pickup roll adapted to rest constantly in close proximity thereto, said pick-up roll having bearings, a stationary frame having openings larger than the bearings for supporting said bearings movably, whereby said pick-up roll can move upwardly away from the fountain roll to permit an obstruction to pass between them.

18. In an inking mechanism the combination of a fountain roll and a pick-up roll having bearings, a stationary frame having openings larger than the bearings, said pick-up roll being located above the fountain roll and vertically adjustable supports in said openings for supporting the pick-up roll just out of contact with the surface of the fountain roll whereby the pick-up roll will receive an unmodified film of ink from the fountain roll and whereby it will be capable of moving upwardly to permit an obstruction to pass between the rolls.

19. In an inking mechanism the combination of an ink fountain, a fountain roll partially submerged in the ink therein and projecting above it and running at a slow speed so as to carry a coating of ink around on its surface in a free flowing condition, a pick-up roll above it running at a high speed in the reverse direction in close proximity to the top surface of the fountain roll so as to take from the coating of ink thereon a portion thereof upon its surface, and means for adjusting the pick-up roll toward and from the fountain roll, whereby the thickness of ink on the pick-up roll will be regulated.

In testimony whereof I have hereunto set my hand, in the presence of two subscribing witnesses.

HENRY A. WISE WOOD.

Witnesses:
BLODIVEN W. JONES,
LILLIAN C. JONES.